3,845,034
PROCESS FOR PRODUCING WATER-INSOLUBLE AZO DYESTUFFS CONTAINING SULFONYL GROUPS USING A METAL SULFINATE
Hanswilli von Brachel, Offenbach, Main, and Dieter Cornelius, Darmstadt-Arheilgen, Germany, assignors to Cassella Farbwerke Mainkur Aktiengesellschaft, Frankfurt am Main, Fechenheim, Germany
No Drawing. Continuation of abandoned application Ser. No. 877,821, Nov. 18, 1969. This application May 10, 1972, Ser. No. 252,348
Claims priority, application Germany, Nov. 20, 1968, P 18 09 921.3
Int. Cl. C09b 43/00; D06p 3/24, 3/52
U.S. Cl. 260—205                          3 Claims

ABSTRACT OF THE DISCLOSURE

Production of water-insoluble azo dyestuffs containing at least one sulfonyl group which comprises reacting a mono- or disazo dyestuff free from water-solubilizing groups and containing halogen or nitro substituents on an aryl or hetero aryl nucleus with a metal sulfinate in a molar ratio at least equivalent to the number of halogen atoms or nitro groups to be exchanged for a sulfonyl group and in a reaction inert organic solvent and optionally in the presence of copper compounds, said dyestuffs being useful for dyeing and printing of textile materials and being distinguished by excellent light and hot air fixing properties.

CROSS-REFERENCE TO RELATED APPLICATION

This application is a continuation of application Ser. No. 877,821 filed Nov. 18, 1969 and now abandoned.

Mono and disazo dyestuffs containing in the diazo component sulfonyl groups linked to an aryl or hetero-aryl ring are already known. Of special interest are in this connection those azo dyestuffs containing in their diazo component three identical or different negative residues, such as nitro, cyano or sulfonyl groups: it is, however, particularly difficult to diazotize such diazo components.

It has, now been found that water-insoluble mono or disazo dyestuffs containing sulfonyl groups are obtained by reacting, in an organic solvent that is indifferent to the reactants and optionally in the presence of copper compounds, mono or disazo dyestuffs free from water solubilizing groups and bearing in the diazo component halogen atoms or nitro groups linked to an aryl or hetero-aryl ring with metal sulfinates, the latter being present in a molar ratio at least equivalent to the number of halogen atoms or nitro groups to be exchanged for a sulfonyl group.

Aryl and hetero-aryl rings within the meaning of the present invention and bearing the halogen atoms or nitro groups to be exchanged are particularly phenyl, diphenyl and naphthyl residues as well as quasi aromatic heterocyclic compounds, such as thiazolyl, benzimidazolyl and pyridyl residues. The fact the exchange reaction between the halogen or the nitro substituents and the sulfinate succeeds in the case of reacting final azo dyestuffs is surprising because very often the exchange of the respective halogen atoms or nitro groups in the diazo components prior to the formation of the azo dyestuff is impossible to carry out or does by far not run so smoothly.

The reaction according to the present invention may be carried out either with metal sulfinates alone or may preferably be accelerated by the addition of copper compounds. Suited metal sulfinates are particularly sodium, potassium, ammonium, calcium, copper or zinc alkyl and aryl-sulfinates, whereby the alkali sulfinates being available as large-scale industrial products are preferred. Such metal sulfinates are for instance: sodium-methyl, -ethyl, -propyl, -butyl and -phenyl-sulfinate and their derivatives that are substituted, for instance, by hydroxyl, alkoxy, or cyano groups or by halogen atoms. As copper compounds to be concurrently used under the present invention particularly suited are the copper (I) and copper (II) compounds, for instance, the respective chlorides, bromides, iodides, oxides, sulfides, sulfates, acetates and nitrates.

It is advisable to choose a reaction temperature of between 20° C. and 200° C., preferably of between 50° C. and 100° C. The duration of the reaction depends to a large extent upon the constitution of the employed azo dyestuff containing the halogen atoms or nitro groups and varies from a few minutes to several hours. In general, it is easier to exchange bromine atoms and nitro groups than chlorine atoms and furthermore it is easier to exchange halogen atoms and nitro groups that are o-positioned to the azo group than those being m or p-positioned. If the initial dyestuff contains more than one exchangeable halogen atom or nitro groups, in particular two chlorine or bromine atoms or nitro groups being in an o-position to the azo group, the corresponding dyestuffs containing more than one sulfonyl group are obtained.

The course of the reaction may easily be followed by means of chromatography so that the terminal point of the reaction may be determined without difficulty when in the chromatogram the spot of the initial dyestuff has disappeared.

Suitable solvents for the claimed process are, for instance, hydrocarbons, in particular aromatic hydrocarbons and their derivatives, such as benzene, toluene, xylene, chlorobenzenes and apart from them alcohols, esters, ethers, pyridine bases, quinoline, N,N-dimethyl-aniline, nitriles, such as acetonitrile, ketones, such as methyl-ethyl-ketone and cyclo-hexanone.

Dipolar aprotic solvents, such as acid amides, especially N,N-disubstituted acid amides, N-alkyl-pyrrolidones, organic sulfoxides and sulfones have proved particularly suitable. The particularly advantageous effect of these solvents is due to the fact that they dissolve at least in part the sulfinates or the copper salts, thus accelerating the reaction. A particularly smooth course of the exchange reaction takes place, for instance, in the case of dimethyl-formamide, dimethylacetamide, hexamethyl-phosphoric acid triamide, N-methyl-pyrrolidone and dimethylsulfoxide. The dipolar aprotic solvents may also be diluted with other inert solvents, such as acetone, dioxan, chloro-benzene or nitro-benzene, whereby the course of the reaction is not adversely affected. It is advisable to choose the solvent itself and the amount of the solvent to be employed so that after the reaction the dyestuff containing sulfonyl groups precipitates, whereas the accompanying substances preferably remain dissolved.

The initial azo dyestuffs to be used under the present invention are, for instance, those water-insoluble disazo dyestuffs containing halogen atoms or nitro groups the diazo component of which derives from one of the following aromatic amines: haloanilines, such as o- and m-bromo-anilines; halotuidines, such as 6-chloro-2-aminotoluene; halonitranilines, such as 2-chloro-, 2-bromo- and 2-iodo-4-nitraniline, 4-chloro-2-nitraniline; halocyano-anilines, such as 2-bromo-4-cyanoaniline; halosulfonyl-anilines, such as 2-bromo-4-methylsulfonyl-aniline or 2-bromo-4-phenyl-sulfonyl-aniline; dinitranilines, such as 2,4-dinitraniline; nitro-cyanoanilines, such as 2-nitro-4-cyano-aniline; nitro-sulfonylanilines, such as 2-nitro-4-ethylsulfonyl-aniline; dihaloanilines, such as 2,3-, 2,4-, 2,5- or 3,4-dibromo-aniline, 2,4-dichloro-5-methyl-aniline; trihalo-anilines, such as 3,4,6-trichloro-aniline; halocyano-nitranilines, such as 2-bromo-4-nitro-6-cyanoaniline; halocyano-alkylsulfonylanilines, such as 2-bromo-4-methylsulfonyl-6-cyanoaniline; halodinitro anilines, such as 2-cyano - 4,6 - dinitraniline; nitro-dicyano-anilines, such as 2,4-dicyano-6-nitritraniline; cyano-alkylsulfonyl-nitranilines, such as 2-cyano-4-methylsulfonyl-6-nitraniline; halo-amino-naphthalines, such as 2-bromo-1-naphthyl-amine; and haloamino-azo compounds, such as 2-bromo-4-nitrophenylazo-(4'-amino-benzene).

If the diazo component of the initial dyestuffs derives from a heterocyclic amine, the following compounds may be employed:

2 - amino-5-bromo-thiazole, 2-amino-5-bromo-imidazole or 3,5-dibromo-4-aminopyridine.

The initial dyestuffs containing in the diazo component halogen atoms or nitro groups to be exchanged, may be prepared with the usual coupling components. Preferred coupling components are tertiary anilines, such as N,N-dialkyl anilines the alkyl groups of which may be unsaturated and/or substituted by negative residues, such as Cl, OH, O-alkyl, O-aryl, CO-O-alkyl, CN, $NO_2$ or alkylsulfonyl, and the nucleus of which may contain further substituents, such as alkyl, alkoxy, halogen or acyl-amino; further preferred coupling components are phenols, such as phenol, o-, m- and p-kresol or pyrazolones such as 1-phenyl-3-methyl-pyrazolone-5.

The dyestuffs to be prepared in accordance with the present invention are suited for the dyeing and printing of textile materials on the basis of cellulose esters, such as 2½-acetate and triacetate, polyamides, polyacrylic-nitrile and especially of polyesters on the basis of polyethylene glycol terephthalate. They impart on those materials dyeings or prints that distinguish themselves by excellent fastness properties. The dyestuffs of the present invention are superior over the corresponding initial dyestuffs containing halogen or nitro groups with regard to their fastness to light and to hot-air fixing.

The following Examples are given for the purpose of illustrating the present invention.

Example 1

14.5 g. copper (I) bromide, 12 g. sodiummethyl-sulfinate and 40 g. 2-bromo - 4 - nitro-1-[4'-N-ethyl-N-cyano-ethyl-amino-phenyl-azo]-benzene are successively introduced into 100 cc. dimethyl-formamide and heated to 100° C. After 1 hour's time the reaction mixture is allowed to cool down, then it is strongly sucked off and the residue is washed with little dimethyl-formamide and a great amount of water. Thus obtained are 31 g. 2-methylsulfonyl-4-nitro-1-[4' - N - ethyl-N-cyano-ethylamino-phenyl-azo]-benzene which in a finely dispersed form dyes polyester fibers red shades.

According to thin layer chromatogram, infrared spectrum and mixed melting point the obtained dyestuff is identical with the product obtained by azo coupling from 2-methylsulfonyl-4-nitraniline and N-ethyl-N-cyano-ethyl-aniline.

Example 2

36.8 g. 2,4-dinitro-1-[4'-N-ethyl-N-cyano-ethylamino-phenylazo]-benzene, 4 g. copper (I) oxide and 15 g. potassium ethylsulfinate are successively introduced into 144 cc. dimethylsulfoxide and heated to 100° C. After 45 minutes' time, the reaction mixture is allowed to cool down, then 50 cc. methanol are added. The reaction mixture is stirred for ½ hour, the precipitate being formed is strongly sucked off, washed with little dimethyl-sulfoxide and much water. Thus obtained are 32 g. of a dyestuff that is identical with that obtained according to Example 1.

Example 3

48 g. 2-chloro-4,6-dinitro-1-(N-cyano-ethyl-N-phenethyl-amino-phenyl-azo)-benzene, 4 g. copper(I)oxide and 12 g. sodium ethyl-sulfinate are introduced into 500 cc. dimethylsulfoxide. The reaction mixture is stirred for 30 minutes at room temperature and subsequently added with stirring to 2,5 l. sodium chloride solution. The precipitate being formed is sucked off, stirred for several hours together with a 10% sodium cyanide solution, sucked off again and washed with much water. Thus obtained are 49 g. 2-chloro-4-nitro-6-ethylsulfonyl-1-[N-cyano-ethyl - N - phenyl-ethylamino-phenyl-azo]-benzene which, in a finely dispersed form, dyes polyester fibers reddish brown shades.

Example 4

46 g. 2-bromo-4-nitro-6-cyano-1-[4'-diethylamino-2'-acetylamino-phenyl-azo]-benzene, 0.8 g. copper(I)oxide and 15 g. potassium methyl-sulfinate are successively introduced into a mixture consisting of 100 cc. dimethylsulfoxide and 100 cc. chloro-benzene and heated to 70° C. After 15 minutes' time, the reaction mixture is allowed to cool down, strongly sucked off, washed with little dimethyl-sulfoxide, methanol and then with much water. Thus obtained are 41 g. 2-methylsulfonyl-4-nitro-6-cyano-1- [4' - diethyl-amino-2'-acetyl-amino-phenyl-azo]-benzene which, in a finely dispersed form, dye polyester fibers clear blue shades. According to thin layer chromatogram, infrared spectrum and mixed melting point the obtained dyestuff is identical with the product described in Example of U.S. Patent Application Ser. No. 791,775.

Example 5

48 g. 2-bromo-4,6-dinitro-1-[4'-diethyl-amino-2'-acetyl-amino-phenyl-azo]-benzene and 9 g. copper(I)cyandide are introduced into 200 cc. dimethyl-sulfoxide and heated to 80° C. After 15 minutes' time, the exchange reaction between the bromine atom and the cyanide is terminated. 15 g. potassium methyl-sulfinate are added and the temperature is maintained for 10 minutes at 70–80° C. Subsequently, the reaction mixture is allowed to cool down, admixed with 100 cc. methanol and strongly sucked off, washed with methanol and water. The obtained dyestuff is identical with the product obtained according to Example 4.

Example 6

42.5 g. 2-cyano-4,6-dinitro-1-[4'-diethylamino-2'-aceylamino-phenyl-azo]-benzene, 9 g. copper(I) cyanide and 12 g. sodium ethyl-sulfinate are introduced into 150 cc. dimethylsulfoxide and heated to 50° C. After 15 minutes' time the reaction mixture is allowed to cool down, admixed with 75 cc. methanol and sucked off and washed with methanol and water. The thus obtained dyestuff is identical with the products obtained according to Examples 4 and 5.

Example 7

40 g. 2,4 dinitro-1-[4' - diethylamino-2'-acetylamino-phenyl-azo]-benzene, 20 g. copper(I) iodide and 20 g. potassium phenyl-sulfinate are introduced into 150 cc. N-methylpyrrolidone and heated 80° C. After 30 minutes' time, the reaction mixture is allowed to cool down and a solution consisting of 8 g. sodium cyanide dissolved in 40 cc. water is added dropwise. The precipitate is sucked off and thoroughly washed with water. Thus obtained are 46 g. 2-phenylsulfonyl-4-nitro-1-[4' - diethyl-amino-2'-acetylamino-phenyl-azo]-benzene which, in a finely dispersed form, dye polyester fibers reddish violet shades.

The following table enumerates further azo dyestuffs containing sulfonyl groups obtained according to the present invention. These dyestuffs are characterized by their shades when applied onto polyester fibers and obtained by reacting the initial dyestuff of the given formula with 1 or 2 moles of a metal sulfinate according to the methods described in the foregoing Examples.

General formula of the initial dyestuffs:

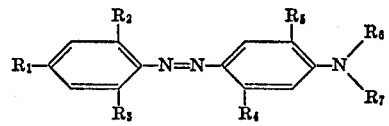

| R₁ | R₂ | R₃ | R₄ | R₅ | R₆ | R₇ | Employed sulfinate whereby X means Na⁺, K⁺ NH₄⁺ or ½ Ca⁺⁺— | Shade on polyester fabric of the final dyestuff containing sulfonyl groups |
|---|---|---|---|---|---|---|---|---|
| H | H | Br | H | H | CH₂CH₂C₆H₅ | CH₂CH₂CN | 1 mol C₄H₉—SO₂X | Golden yellow. |
| H | H | NO₂ | H | H | CH₂CH₂CN | CH₂CH₂CN | 1 mol CH₃—SO₂X | Yellow. |
| H | CH₃ | Cl | H | H | C₂H₅ | CH₂CH₂OH | 1 mol C₆H₅—SO₂X | Golden yellow. |
| NO₂ | H | Br | H | H | C₂H₅ | CH₂CH₂CN | 1 mol C₂H₅—SO₂X | Red. |
| NO₂ | H | NO₂ | CH₃ | H | CH₃ | CH₂CH₂SO₂CH₃ | 1 mol CH₃—SO₂X | Ruby. |
| NO₂ | H | NO₂ | NHCOCH₃ | H | C₂H₅ | C₂H₅ | 1 mol CH₃—SO₂X | Red violet. |
| CN | H | Br | H | H | CH₂CH₂CN | CH₂CH₂COOCH₃ | 1 mol C₂H₅—SO₂X | Scarlet. |
| CN | H | NO₂ | H | H | C₄H₉ | CH₂CH₂CN | 1 mol CH₃—SO₂X | Do. |
| SO₂CH₃ | H | Br | OC₂H₅ | H | C₂H₅ | CH₂CH₂OCOCH₃ | 1 mol C₂H₅—SO₂X | Red. |
| Br | H | NO₂ | H | H | CH₂CH₂OCOCH₃ | CH₂CH₂OCOCH₃ | 2 mols CH₃—SO₂X | Orange. |
| SO₂C₂H₅ | H | Br | H | H | C₂H₅ | C₂H₅ | 1 mol C₆H₅—SO₂X | Red. |
| NO₂ | CN | Br | H | H | C₂H₅ | CH₂CH₂OCOCH₃ | 1 mol CH₃—SO₂X | Violet. |
| NO₂ | CN | NO₂ | NHCONHCH₂CH=CH₂ | H | C₂H₅ | C₂H₅ | 1 mol C₂H₅—SO₂X | Blue. |
| NO₂ | CN | NO₂ | NHCOCH₃ | OCH₃ | CH₂CH₂OCOCH₃ | C₂H₅ | 1 mol C₂H₅—SO₂X | Do. |
| CN | CN | Br | NHCOCH₃ | H | C₂H₅ | CH₂CH₂CN | 1 mol CH₃—SO₂X | Violet. |
| CN | CN | NO₂ | NHCOCH₃ | H | C₂H₅ | C₂H₅ | 1 mol C₂H₅—SO₂X | Blue violet. |
| CH₃SO₂ | CN | Br | NHCOCH₃ | H | C₂H₅ | C₂H₅ | 1 mol C₂H₅—SO₂X | Do. |
| Br | CN | NO₂ | H | H | CH₂CH₂CN | CH₂CH₂OCOCH₃ | 2 mols CH₃—SO₂X | Ruby. |

Example 8

15 g. zinc-methyl-sulfinate obtained by reduction of methan sulfochloride with zinc, 45 g. 2-bromo-4-nitro-6-cyano-1-[4'-diethyl-amino - 2' - acetylamino-phenyl-azo]-benzene and 0.2 g. copper(I)oxide are introduced into 150 cc. dimethylsulfoxide and heated for 2 hours to 80° C. Subsequently, the reaction mixture is allowed to cool down, the precipitate being formed is strongly sucked off and washed with little dimethyl-sulfoxide, then with water. Thus obtained are, after drying, 35 g. 2-methylsulfonyl-4-nitro-6-cyano-1-[4'-diethylamino - 2' - acetylamino-phenyl-azo]-benzene, which, in a finely dispersed form, dyes polyester fibers clear blue shades.

Example 9

Differences in the effectiveness of the employed copper compounds depending upon the temperature and duration of the reaction are illustrated by the following tests:

5 g. 2-bromo-4-nitro-6-cyano-1-[4' - diethylamino-2'-acetylamino-phenyl-azo]-benzene, 3 g. zinc methyl-sulfinate and 1 g. of the respective copper compound were stirred in 50 cc. dimethyl-formamide for 1 hour at room temperature or for 30 minutes at 60° C. Subsequently, the achieved degree of the reaction was determined by analysis.

The following table shows in percentages the respective degree of the reaction depending upon the duration of the reaction:

| | Reaction conditions | |
|---|---|---|
| | 1 hour at 20° percent | ½ hour at 60° percent |
| Copper compound employed: | | |
| CuO | | 15 |
| Cu₂[Fe(CN)₆] | | 20 |
| CuCO₃ | | 30 |
| CuCrO₂ | | 40 |
| CuSO₄ | | 50 |
| Cu₂O | | 80 |
| CuS | 10 | 10 |
| CuCl | 10 | 80 |
| CuSCN | 25 | 100 |
| Cu(OCOCH₃)₂ | 25 | 100 |
| Cu(NO₃)₂ | 30 | 100 |
| CuCl | 50 | 95 |
| CuBr | 50 | 100 |
| CuJ | 50 | 100 |
| Without copper salt | | 5 |

What we claim is:

1. A process for producing a water-insoluble azo dyestuff of the formula

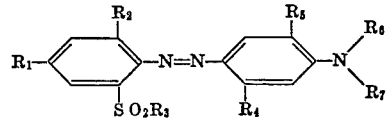

wherein R₁ is H, NO₂, CN, Br, —SO₂CH₃ or —SO₂C₂H₅; R₂ is H, —CH₃, CN or Cl; R₃ is —CH₃, —C₂H₅, —C₄H₉ or phenyl; R₄ is H, —CH₃, —OC₂H₅, —NHCOCH₃ or —NHCONHCH₂CH=CH₂; R₅ is H or —OCH₃; R₆ is —C₂H₅, —CH₂CH₂CN, —CH₃, —C₄H₉ or

—CH₂CH₂OCOCH₃ and R₇ is —C₂H₅, —CH₂CH₂-phenyl, —CH₂CH₂CN, —CH₂CH₂OH, —CH₂CH₂SO₂CH₃, —CH₂CH₂COOCH₃ or —CH₂CH₂OCOH₃, said process comprising heating an azo dyestuff of the formula

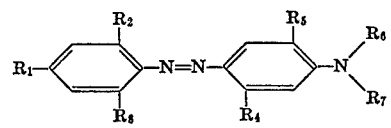

wherein R₁–R₇ inclusive are as aforesaid and R₈ is Cl, Br or NO₂ with a metal organo sulfinate wherein the metal moiety is sodium, potassium, ammonium, calcium, copper or zinc and said organo moiety is methyl, ethyl, propyl, butyl or phenyl in an inert organic solvent at a temperature of between 20 and 200° C. in the presence of a copper compound, said metal organo sulfinate being present in a molar ratio at least equivalent to the number of Cl, Br or NO₂ groups to be exchanged for a sulfonyl group and said copper compound being cuprous or cupric oxide, chloride, bromide, iodide, sulfate, rhodanide, acetate, nitrate, carbonate, sulfide, cyanide, chromite or hexacyanoferrate.

2. The process of claim 1 wherein said temperature is between 20 and 100° C.

3. The process of claim 1 wherein said temperature is between 50 and 100° C.

(References on following page)

References Cited

UNITED STATES PATENTS

| | | | |
|---|---|---|---|
| 1,936,721 | 11/1933 | Landers | 260—607 A |
| 2,010,754 | 8/1935 | Felix et al. | 260—607 A X |
| 2,434,150 | 1/1948 | Dickey et al. | 260—152 |
| 2,776,992 | 1/1957 | Gregory | 260—607 A X |
| 3,249,640 | 5/1966 | Markgraf et al. | 260—607 A |
| 3,692,769 | 9/1972 | Weaver et al. | 260—207.1 |

OTHER REFERENCES

Houben-Weyl, "Methoden der Organischen Chemie," vol. IX, pp. 231 to 233 (1955).

Theilheimer: "Synthetic Methods of Organic Chemistry," vol. 2, pp. 188 and 189 (1949).

Theilheimer: "Synthetic Methods of Organic Chemistry" vol. 3, p 243 (1949).

Kauffman: J. Chem. Eng. Data, vol. 14, No. 4, pp. 498–499 (1969).

FLOYD D. HIGEL, Primary Examiner

U.S. Cl. X.R.

260—156, 157, 158, 206, 207, 207.1, 207.5, 208

UNITED STATES PATENT OFFICE
CERTIFICATE OF CORRECTION

Patent No. 3,845,034          Dated  October 29, 1974

Inventor(s)  Hanswilli von Brachel and Dieter Cornelius

It is certified that error appears in the above-identified patent and that said Letters Patent are hereby corrected as shown below:

Col. 2, line 61, "halotuidines" should read -- halotoluidines --.

Col. 3, line 60, "ethylsulfinate" should read -- methylsulfinate --.

Col. 4, line 31, "cyandide" should read -- cyanide --;

line 46, "ethyl-sulfinate" should read -- methyl-sulfinate --;

line 60, "up to" should be inserted after "heated".

Col. 5, line 65, "CuCl" should read -- $CuCl_2$ --.

Signed and Sealed this

Twenty-fourth Day of October 1978

[SEAL]

Attest:

RUTH C. MASON
Attesting Officer

DONALD W. BANNER
Commissioner of Patents and Trademarks